US012608404B2

(12) United States Patent
Pauletto et al.

(10) Patent No.: US 12,608,404 B2
(45) Date of Patent: Apr. 21, 2026

(54) DATA MANAGEMENT SYSTEM, CORRESPONDING DATA MANAGEMENT METHOD AND COMPUTER PROGRAM

(71) Applicant: BULL SAS, Les Clayes-sous-Bois (FR)

(72) Inventors: Loïc Pauletto, Grenoble (FR); Guillaume Morin, Grenoble (FR); Nicolas Winckler, Villard Bonnot (FR)

(73) Assignee: BULL SAS, Les Clayes-sous-Bois (FR)

( * ) Notice: Subject to any disclaimer, the term of this patent is extended or adjusted under 35 U.S.C. 154(b) by 10 days.

(21) Appl. No.: 18/918,571

(22) Filed: Oct. 17, 2024

(65) Prior Publication Data

US 2025/0131018 A1 Apr. 24, 2025

(30) Foreign Application Priority Data

Oct. 19, 2023 (EP) ..................................... 23306835

(51) Int. Cl.
*G06F 7/00* (2006.01)
*G06F 16/28* (2019.01)
(52) U.S. Cl.
CPC .................................. *G06F 16/285* (2019.01)
(58) Field of Classification Search
CPC ...................................................... G06F 16/285
USPC ................................................. 707/600–899
See application file for complete search history.

(56) References Cited

U.S. PATENT DOCUMENTS

| | | | |
|---|---|---|---|
| 2009/0281970 A1* | 11/2009 | Mika ..................... | G06F 40/169 |
| | | | 706/12 |
| 2022/0044149 A1 | 2/2022 | Rand et al. | |
| 2022/0207303 A1 | 6/2022 | Barkan et al. | |
| 2022/0319153 A1 | 10/2022 | Iwaki et al. | |

OTHER PUBLICATIONS

European Search Report issued in EP23306835 on Feb. 26, 2024.

* cited by examiner

*Primary Examiner* — Isaac M Woo
(74) *Attorney, Agent, or Firm* — ARC IP Law, PC; Joseph J. Mayo

(57) ABSTRACT

The invention relates to a data management system including a storing unit and a processing unit. The storing unit includes a dataset memory that stores at least one dataset; a metadata memory that stores, for each dataset stored in the dataset memory, respective metadata; and an annotation memory that stores at least one predetermined annotation value. The processing unit, upon storing of an additional dataset in the dataset memory, determines whether the additional dataset includes dataset annotations descriptive of the data comprised in said additional dataset; performs a mapping of each dataset annotation onto the at least one predetermined annotation value; and writes, in the metadata memory, in relation to the additional dataset, metadata representative of a result of the mapping.

8 Claims, 1 Drawing Sheet

DATA MANAGEMENT SYSTEM, CORRESPONDING DATA MANAGEMENT METHOD AND COMPUTER PROGRAM

This application claims priority to European Patent Application Number 23306835.2, filed 19 Oct. 2023, the specification of which is hereby incorporated herein by reference.

BACKGROUND OF THE INVENTION

Field of the Invention

At least one embodiment of the invention relates to a data management system including a storing unit and a processing unit.

At least one embodiment of the invention further relates to a data management method and a computer program.

At least one embodiment of the invention applies to the field of computer science, and more specifically to the management of data for computer learning.

Description of the Related Art

In the field of computer learning, it is known to store large amounts of data to be used as training data for training artificial intelligence models (hereinafter, "models").

Such sets of data generally come from heterogenous sources, so that the data generally differ with regards to their formats or the associated learning criteria.

By "learning criterion", it is meant, in the context of the present invention, information relating to given data, and providing a description thereof, said description being generally used as a base for the training of a model. Examples of such learning criteria may include classes, position of labelled objects in an image, encoding in a specific space, depth masks, text description of an image, etc.

Despite their initial heterogeneity, it is required that such data be harmonized in order to allow efficient training of models. Such harmonization may also be required to efficiently access and browse such data based on specific learning criteria, for instance when creating training datasets or validation datasets for training one or several models.

Known solutions to perform such harmonization usually involve manually annotating the data However, such method is not satisfactory.

Indeed, manually annotating the data may be very cumbersome, especially with the increasingly large sets of data currently used in the field of computer learning.

Furthermore, with evolving regulations, such as the AI Act, the traceability of data used for model training has to be guaranteed for potential audits. Yet, the manual annotation described above generally implies altering the data, which is detrimental to said traceability.

A purpose of the present invention is to overcome at least one of these drawbacks.

Another purpose of the invention is to provide a data management method for harmonizing datasets that is easy to perform and that maintains traceability.

BRIEF SUMMARY OF THE INVENTION

To this end, at least one embodiment of the invention relates to a data management system of the aforementioned type, wherein the storing unit comprises:

a dataset memory configured to store at least one dataset;

a metadata memory configured to store, for each dataset stored in the dataset memory, respective metadata; and an annotation memory configured to store at least one predetermined annotation value;

the processing unit being configured to, upon storing of an additional dataset in the dataset memory:

determine whether the additional dataset includes dataset annotations descriptive of the data comprised in said additional dataset;

perform a mapping of each dataset annotation onto the at least one predetermined annotation value;

write, in the metadata memory, in relation to the additional dataset, metadata representative of a result of the mapping.

Indeed, in at least one embodiment, by using the metadata memory, it is possible to automatically add information to each dataset without altering the dataset, thereby guaranteeing traceability.

Such metadata memory also imparts the data management system with great flexibility, since additional learning criteria can be continuously added to each dataset.

Furthermore, in one or more embodiments, by mapping the annotations of a new dataset onto a set of predetermined annotation values, more homogeneous datasets (with regard to the associated learning criteria) are obtained. Thanks to such automatic harmonization, accessing the data (e.g., for the purpose of organizing said data by learning criteria) is made easier.

Advantageously, in one or more embodiments, the data management system further includes one or more of the following features, taken individually or according to any technically possible combination:

the mapping includes:

encoding each dataset annotation into a predetermined space to obtain a respective encoded dataset annotation;

for each encoded dataset annotation:

determining a distance, with regard to a predetermined metric, between said encoded dataset annotation and the closest encoded predetermined annotation value, each encoded predetermined annotation value being a result of encoding a respective predetermined annotation value into the predetermined space;

if the determined distance is lower than a predetermined threshold, matching the respective dataset annotation with the predetermined annotation value corresponding to said closest encoded predetermined annotation value;

for each encoded dataset annotation, if the determined distance is greater than the predetermined threshold, the processing unit is configured to assign a predetermined annotation to the respective dataset annotation;

encoding a dataset annotation, respectively a predetermined annotation value, includes applying a language model to said dataset annotation, respectively said predetermined annotation value, to determine a corresponding embedding as at least part of the respective encoded dataset annotation, respectively the respective encoded predetermined annotation value;

the metadata associated with the additional dataset comprises, for each dataset annotation, the predetermined annotation value matched with said dataset annotation;

the storing unit further includes a model memory configured to store at least one previously trained artificial intelligence model, each forming a reference model, the processing unit being configured to, if it is determined that the additional dataset does not include dataset annotations, for each reference model:

apply said reference model to the additional dataset;

write, in the metadata memory, in relation to the additional dataset, metadata representative of an output of said reference model;

the storing unit further includes a model memory configured to store at least one previously trained artificial intelligence model, each forming a reference model, and upon storing of an additional reference model in the model memory, the processing unit being configured to, for each dataset in the dataset memory:

apply the additional reference model to said dataset; and write, in the metadata memory, in relation to said dataset, metadata representative of an output of the additional reference model.

The system, in at least one embodiment, may be a personal device such as a smartphone, a tablet, a smartwatch, a computer, any wearable electronic device, etc.

The system according to one or more embodiments of the invention may execute one or several applications to carry out the method according to at least one embodiment of the invention.

The system according to one or more embodiments of the invention may be loaded with, and configured to execute, a computer program according to the invention.

At least one embodiment of the invention also relates to a computer-implemented data management method comprising, upon storing of an additional dataset in a dataset memory included in a storing unit, the steps:

determining whether the additional dataset includes dataset annotations descriptive of the data comprised in said additional dataset;

mapping each dataset annotation onto at least one predetermined annotation value stored in an annotation memory included in the storing unit;

writing, in a metadata memory included in the storing unit, metadata representative of a result of the mapping, in relation to the additional dataset.

According to at least one embodiment of the invention, it is proposed a computer program comprising instructions, which when executed by a computer, cause the computer to carry out the steps of the data management method as defined above.

The computer program may be in any programming language such as C, C++, JAVA, Python, etc.

The computer program may be in machine language.

The computer program may be stored, in a non-transient memory, such as a USB stick, a flash memory, a hard-disc, a processor, a programmable electronic chop, etc.

The computer program may be stored in a computerized device such as a smartphone, a tablet, a computer, a server, etc.

BRIEF DESCRIPTION OF THE DRAWINGS

Other advantages and characteristics will become apparent on examination of the detailed description of at least one embodiment which is in no way limitative, and the attached figures, where.

DETAILED DESCRIPTION OF THE INVENTION

It is well understood that the one or more embodiments that will be described below are in no way limitative. In particular, it is possible to imagine variants of the one or more embodiments of the invention comprising only a selection of the characteristics described hereinafter, in isolation from the other characteristics described, if this selection of characteristics is sufficient to confer a technical advantage or to differentiate the one or more embodiments of the invention with respect to the state of the prior art. Such a selection comprises at least one, preferably functional, characteristic without structural details, or with only a part of the structural details if this part alone is sufficient to confer a technical advantage or to differentiate the one or more embodiments of the invention with respect to the prior art.

In the figures, elements common to several figures retain the same reference.

Figure 1:
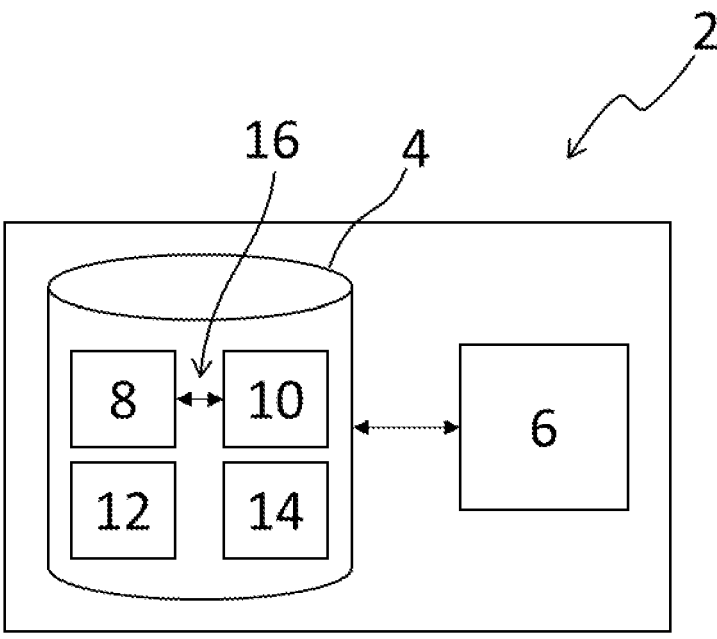
FIG. 1 is a schematic representation of a data management system according to one or more embodiments of the invention.

A data management system 2 according to one or more embodiments of the invention is shown on FIG. 1.

The data management system 2 is configured to manage datasets, and more specifically to harmonize said datasets, preferably while maintaining traceability.

The data management system includes a storing unit 4 and a processing unit 6 connected to one another.

Storing Unit

The storing unit 4 is configured to store data, especially large amounts of data, preferably aggregated as datasets, such as training datasets and/or validation datasets for training artificial intelligence models. The storing unit 4 may also be referred to as a data lake.

The storing unit 4 includes a dataset memory 8, a metadata memory 10 and an annotation memory 12.

Preferably, the storing unit 4 further comprises a model memory 14.

Dataset Memory 8

The dataset memory 8 is configured to store at least one dataset.

Each dataset includes data that may be used to train artificial intelligence models.

Each dataset may further comprise annotations (also referred to as "labels") that are descriptive of the data included in said dataset, i.e., that provide additional knowledge regarding the data included in said dataset.

As an example, in at least one embodiment, if a dataset stored in the dataset memory 8 includes images, then, for a given image of said dataset, each corresponding annotation may be indicative of a class to which belongs each object in a said image.

Each dataset may have been collected from any source of data, such as a repository, sensors, etc.

Metadata Memory 10

For each dataset in the dataset memory 8, the metadata memory 10 is configured to store corresponding metadata. In other words, in one or more embodiments, for each dataset in the dataset memory 8, the storing unit 4 includes a link (arrow 16) linking said dataset to the respective metadata.

For instance, in at least one embodiment, the links between the datasets in the dataset memory 8 and the corresponding metadata in the metadata memory 10 may be written in a correlation table (not shown) stored in the storing unit 4.

For each dataset, in at least one embodiment, the corresponding metadata are descriptive of the data included in said dataset. For instance, in one or more embodiments, each metadatum (i.e., piece of metadata) belonging to metadata in the metadata memory 10 associated with a given dataset in the dataset memory 8 may relate to a respective datum (i.e., piece of data) of said dataset.

Annotation Memory 12

Furthermore, in at least one embodiment, the annotation memory 12 is configured to store at least one predetermined annotation value.

For instance, in at least one embodiment, each annotation value has been previously defined by a user of the data management system 2.

Model Memory 14

The model memory 14 is configured to store at least one previously trained artificial intelligence model. Hereinafter, by way of one or more embodiments, each previously trained artificial intelligence model stored in the model memory 14 is referred to as "reference model".

Processing Unit

The processing unit 6 is configured to execute tasks based on predetermined triggers relating to actions performed on the storing unit 4, by way of one or more embodiments.

More precisely, each trigger causes the processing unit 6 to implement a data management method 20 (FIG. 2), according to one or more embodiments of the invention.

The data management method 20, in at least one embodiment, includes a determination step 22, a mapping step 24 and a writing step 26.

Determination Step 22

More specifically, by way of one or more embodiments, upon storing of an additional dataset in the dataset memory 8 (i.e., when storing of an additional dataset in the dataset memory 8 is detected), the processing unit 6 is configured to determine, during the determination step 22, whether said additional dataset includes dataset annotations that are descriptive of the data comprised in said additional dataset.

In this case, in at least one embodiment, storing of an additional dataset in the dataset memory 8 is the trigger to the implementation of the data management method 20.

Mapping Step 24

Moreover, in one or more embodiments, if the additional dataset includes dataset annotations, the processing unit 6 is configured to perform, during the mapping step 24, a mapping of each corresponding dataset annotation onto the at least one predetermined annotation value stored in the annotation memory 12.

Preferably, in at least one embodiment, to perform such mapping, the processing unit 6 is configured to encode each dataset annotation into a predetermined space to obtain a respective encoded dataset annotation.

Preferably, in at least one embodiment, in the case where the dataset annotations are words, the processing unit 6 is configured to apply a language model to each dataset annotation in order to encode said dataset annotation. As a result, for each dataset annotation, the output of the language model is a corresponding embedding. In this case, in at least one embodiment, for each dataset annotation, the corresponding output embedding forms at least part of the respective encoded dataset annotation. Furthermore, in this case, the predetermined space is a vector space of embeddings.

As a non-limiting example, by way of one or more embodiments, the language model is BERT ("Bidirectional Encoder Representations from Transformers").

Furthermore, in at least one embodiment, each predetermined annotation value is associated with a respective encoded predetermined annotation value. More precisely, for each predetermined annotation value, the respective encoded predetermined annotation value is a result of encoding said predetermined annotation value in the aforementioned predetermined space.

For instance, in at least one embodiment, the processing unit 6 is configured to encode, in the predetermined space, during the mapping step 24, each predetermined annotation value so as to obtain the respective encoded predetermined annotation value.

Preferably, in at least one embodiment, in the case where the predetermined annotation values are words, the processing unit 6 is configured to apply a language model to each predetermined annotation value to perform such encoding. In this case, in at least one embodiment, for each predetermined annotation value, the corresponding embedding forms at least part of the respective encoded predetermined annotation value.

Alternatively, in at least one embodiment, for each predetermined annotation value, the annotation memory 12 further stores the respective encoded predetermined annotation value in each predetermined space. In this case, in one or more embodiments, to perform the mapping, the processing unit 6 is configured to retrieve from the annotation memory 12, for each predetermined annotation value, the corresponding encoded predetermined annotation value for the current predetermined space.

Moreover, in one or more embodiments, for each encoded dataset annotation, the processing unit 6 is configured to determine a distance, with regard to a predetermined metric, between said encoded dataset annotation and the closest encoded predetermined annotation value.

For instance, such metric is the L2-norm or the cosine similarity, both known to the person skilled in the art.

Furthermore, in one or more embodiments, for each encoded dataset annotation, if the determined distance is lower than a predetermined threshold, the processing unit 6 is configured to match the respective dataset annotation with the predetermined annotation value corresponding to said closest encoded predetermined annotation value.

Moreover, in one or more embodiments, for each encoded dataset annotation, if the determined distance is greater than the predetermined threshold, the processing unit 6 is preferably configured to assign, to the respective dataset annotation, a predetermined annotation indicative that the respective dataset annotation is not relevant.

Writing Step 26

Moreover, in one or more embodiments, the processing unit 6 is configured to write, during the writing step 26, in the metadata memory 8, in relation to the additional dataset, metadata representative of a result of the mapping.

Preferably, in one or more embodiments, the metadata associated with the additional dataset comprises, for each dataset annotation, the predetermined annotation value matched with said dataset annotation.

Preferably, in at least one embodiment, if, during the determination step 22, it is determined that the additional dataset does not include dataset annotations, the processing unit 6 is configured to apply, for each reference model stored in the model memory 14, said reference model to the additional dataset.

In this case, in one or more embodiments, the processing unit 6 is further configured to write, in the metadata memory 10, in relation to the additional dataset, metadata representative of an output of each reference model.

Preferably, in at least one embodiment, storing of an additional dataset in the dataset memory 8 forms another trigger for the processing unit 6.

In this case, in one or more embodiments, upon storing of an additional reference model in the model memory, the processing unit 6 is configured to, for each dataset in the dataset memory 8, apply the additional reference model to said dataset.

In this case, in at least one embodiment, for each dataset, the processing unit 6 is further configured to write, in the metadata memory 10, in relation to said dataset, metadata representative of an output of the additional reference model applied to said dataset.

Operation

Figure 2:
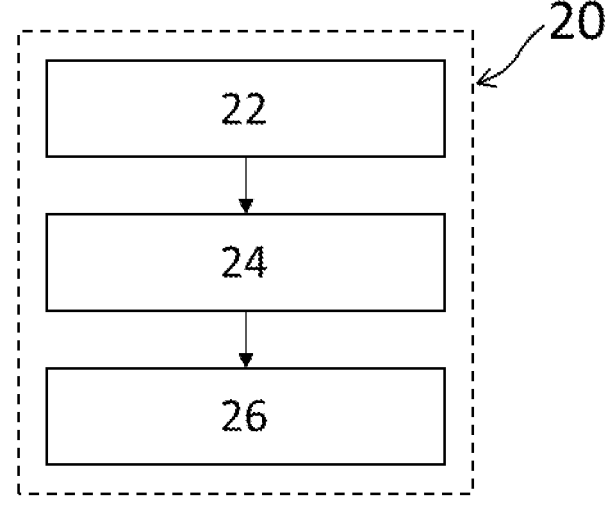
FIG. 2 is a flowchart of a data management method performed by the data management system of FIG. 1, according to one or more embodiments of the invention.

Operation of the data management system 2 will now be described with reference to FIGS. 1 and 2, according to one or more embodiments of the invention.

If storing of an additional dataset in the dataset memory 8 is detected, then, during the determination step 22, the processing unit 6 determines whether the additional dataset includes dataset annotations.

If the additional dataset includes dataset annotations, then, during the mapping step 24, the processing unit 6 maps each dataset annotation onto the predetermined annotation values stored in the annotation memory 12.

Preferably, in one or more embodiments, to perform such mapping, the processing unit 6 encodes each dataset annotation into the predetermined space to obtain a respective encoded dataset annotation.

In this case, in at least one embodiment, for each encoded dataset annotation, the processing unit 6 determines a distance between said encoded dataset annotation and the closest encoded predetermined annotation value.

Preferably, in one or more embodiments, for each encoded dataset annotation, if the determined distance is lower than the predetermined threshold, the processing unit 6 matches the dataset annotation with the predetermined annotation value that corresponds to said closest encoded predetermined annotation value.

Then, during the writing step 26, the processing unit 6 writes, in the metadata memory 8, and in relation to the additional dataset, metadata representative of a result of the mapping.

Conversely, in one or more embodiments, if the additional dataset does not include dataset annotations, then the processing unit 6 applies, to the additional dataset, each reference model stored in the model memory 14.

In this case, in at least one embodiment, the processing unit 6 further writes, in the metadata memory 10, in relation to the additional dataset, metadata representative of an output of each reference model.

If storing of an additional dataset in the dataset memory 8 is detected, the processing unit 6 applies the additional reference model to each dataset in the dataset memory 8.

In this case, in one or more embodiments, for each dataset, the processing unit 6 further writes in the metadata memory 10, in relation to said dataset, metadata representative of an output of the additional reference model when applied to said dataset.

Of course, the one or more embodiments of the invention are not limited to the examples detailed above.

The invention claimed is:

1. A data management system comprising:
a storing unit, and
a processing unit,
wherein the storing unit comprises
a dataset memory configured to store at least one dataset;
a metadata memory configured to store, for each dataset of said at least one dataset stored in the dataset memory, respective metadata; and
an annotation memory configured to store at least one predetermined annotation value;
wherein the processing unit is configured to, upon storing of an additional dataset in the dataset memory, determine whether the additional dataset includes dataset annotations descriptive of data comprised in said additional dataset;
perform a mapping of each dataset annotation of the dataset annotations onto the at least one predetermined annotation value;
write, in the metadata memory, in relation to the additional dataset, metadata representative of a result of the mapping;
wherein the mapping comprises
encoding said each dataset annotation into a predetermined space to obtain a respective encoded dataset annotation;
for said each dataset annotation that is encoded,
determining a distance, with regard to a predetermined metric, between said each dataset annotation that is encoded and a closest encoded predetermined annotation value, each encoded predetermined annotation value being a result of encoding a respective predetermined annotation value into the predetermined space;
if the distance that is determined is lower than a predetermined threshold, matching a respective dataset annotation with the respective predetermined annotation value corresponding to said closest encoded predetermined annotation value.

2. The data management system according to claim 1, wherein, for said each dataset annotation that is encoded, if the distance that is determined is greater than the predetermined threshold, the processing unit is further configured to assign a predetermined annotation to the respective dataset annotation.

3. The data management system according to claim 1, wherein said encoding said each dataset annotation, respectively said respective predetermined annotation value, includes applying a language model to said each dataset annotation, respectively said respective predetermined annotation value, to determine a corresponding embedding as at least part of the respective encoded dataset annotation, respectively the each encoded predetermined annotation value corresponding therewith.

4. The data management system according to claim 1, wherein the metadata associated with the additional dataset comprises, for said each dataset annotation, the respective predetermined annotation value matched with said each dataset annotation.

5. The data management system according to claim 1, wherein the storing unit further comprises a model memory configured to store at least one previously trained artificial intelligence model, each forming a reference model,
wherein the processing unit is further configured to, if it is determined that the additional dataset does not include dataset annotations, for each reference model,
apply said reference model to the additional dataset;
write, in the metadata memory, in relation to the additional dataset, metadata representative of an output of said reference model.

6. The data management system according to claim 1, wherein the storing unit further comprises a model memory configured to store at least one previously trained artificial intelligence model, each forming a reference model, and
upon storing of an additional reference model in the model memory, the processing unit is further configured to, for said each dataset in the dataset memory,
apply the additional reference model to said each dataset; and write, in the metadata memory, in relation to said each dataset, metadata representative of an output of the additional reference model.

7. A computer-implemented data management method comprising:

storing an additional dataset in a dataset memory included in a storing unit;

determining whether the additional dataset includes dataset annotations descriptive of data comprised in said additional dataset;

mapping each dataset annotation of the dataset annotations onto at least one predetermined annotation value stored in an annotation memory included in the storing unit;

writing, in a metadata memory included in the storing unit, metadata representative of a result of the mapping, in relation to the additional dataset;

wherein the mapping comprises encoding said each dataset annotation into a predetermined space to obtain a respective encoded dataset annotation;

for said each dataset annotation that is encoded, determining a distance, with regard to a predetermined metric, between said each dataset annotation that is encoded and a closest encoded predetermined annotation value, each encoded predetermined annotation value being a result of encoding a respective predetermined annotation value into the predetermined space;

if the distance that is determined is lower than a predetermined threshold, matching a respective dataset annotation with the respective predetermined annotation value corresponding to said closest encoded predetermined annotation value.

8. A non-transitory computer program product comprising instructions, which when executed by a computer, cause the computer to carry out a data management method, said data management method comprising:

storing an additional dataset in a dataset memory included in a storing unit;

determining whether the additional dataset includes dataset annotations descriptive of data comprised in said additional dataset;

mapping each dataset annotation of the dataset annotations onto at least one predetermined annotation value stored in an annotation memory included in the storing unit;

writing, in a metadata memory included in the storing unit, metadata representative of a result of the mapping, in relation to the additional dataset;

wherein the mapping comprises encoding said each dataset annotation into a predetermined space to obtain a respective encoded dataset annotation;

for said each dataset annotation that is encoded, determining a distance, with regard to a predetermined metric, between said each dataset annotation that is encoded and a closest encoded predetermined annotation value, each encoded predetermined annotation value being a result of encoding a respective predetermined annotation value into the predetermined space;

if the distance that is determined is lower than a predetermined threshold, matching a respective dataset annotation with the respective predetermined annotation value corresponding to said closest encoded predetermined annotation value.

* * * * *